United States Patent [19]

Hall

[11] 4,109,415
[45] Aug. 29, 1978

[54] PLANT CARE APPARATUS

[76] Inventor: Bruce John Hall, 34352 El Molino, Capistrano Beach, Calif. 92624

[21] Appl. No.: 715,890

[22] Filed: Aug. 19, 1976

[51] Int. Cl.² .............................................. A47G 7/02
[52] U.S. Cl. ........................................ 47/67; 211/113
[58] Field of Search ....................... 47/66, 67; 211/113

[56] References Cited

U.S. PATENT DOCUMENTS

| 912,472 | 2/1909 | Hart | 47/67 |
|---|---|---|---|
| 2,486,932 | 11/1949 | Elliott | 47/71 X |
| 2,859,557 | 11/1958 | Lattuca | 47/66 |
| 3,854,242 | 12/1974 | Gladstein | 47/66 |
| 3,943,661 | 3/1976 | DeVito | 47/67 |

FOREIGN PATENT DOCUMENTS

| 89,083 | 4/1958 | Netherlands | 47/67 |
|---|---|---|---|
| 321,361 | 11/1929 | United Kingdom | 47/67 |

*Primary Examiner*—E. H. Eickholt
*Attorney, Agent, or Firm*—Edward E. Roberts

[57] ABSTRACT

An improved apparatus for use in caring for plants or horticultural items. The apparatus comprises a generally cylindrical member having stepped areas of varying diameter progressing from a large diameter to a small diameter wherein flower pots or the like of different diameters can be accomodated by the instant apparatus. In addition, the apparatus includes strap members or the like for hanging the apparatus from hanging baskets, pots or the like. The apparatus is useful as a catch basin or drip pan for receiving residue from a flower pot or the like during a watering process. Alternatively, the apparatus may be used as a watering pan for plants or the like which require prolonged soaking or watering.

3 Claims, 4 Drawing Figures

PLANT CARE APPARATUS

BACKGROUND OF THE INVENTION

1. Field of the Invention

This invention is related to a new and useful plant care item in general and to a new apparatus which alternatively is useful as a watering apparatus or a sediment receiving apparatus.

2. Prior Art

One nearly universal vocation or avocation is the growth and care of potted plants whether of a hanging or other variety. These types of plants give a great deal of satisfaction to the growers thereof. For most growers, these plants provide a welcome relief to household chores and confinement. The plants tend to add color and excitement to many decors. However, these advantages are partly overcome or outweighed by the disadvantages encountered. That is, the difficulties in caring for such household plants, the watering and feeding thereof, can become a very unpleasant chore. In most cases, the household plants whether indoors or outdoors, whether potted or hanging, produce undesirable problems during the feeding and watering thereof. That is, in order to properly care for most plants it is essential to cause the soil in which the plant is rooted to be substantially saturated with water or other suitable fluid. To assure adequate watering or feeding is achieved, it frequently happens that excess water drips through the bottom of the pot or basket (or conversely overflows the pot or holder) thereby causing undesirable staining and/or making of the floor or surface therebeneath. These shortcomings can be extremely troublesome in areas where the surface or surface covering is expensive or of such a nature that it must be maintained at all times.

There are known kinds of apparatus which are used in conjunction with plants of the type described supra. Some of these kinds of apparatus are described in U.S. Patents discovered by applicant. The patents which appear to be most pertinent are: U.S. Pat. Nos. 608,590, G.A. Freund; 1,249,973, A.E. Lutey; and 951,684, J.E. Gillespie. However, the items covered by each of these patents is believed to have serious shortcomings.

SUMMARY OF THE INVENTION

This invention relates to apparatus useful in the care and feeding of household plants or the like. The basic apparatus comprises a step or tiered, substantially cylindrical receptacle which can receive flower pots or other plant holders of varying diameters. In addition the apparatus includes straps which may be used in suspending the apparatus from beneath a hanging pot or the like.

DESCRIPTION OF PREFERRED EMBODIMENT

Figure 1:
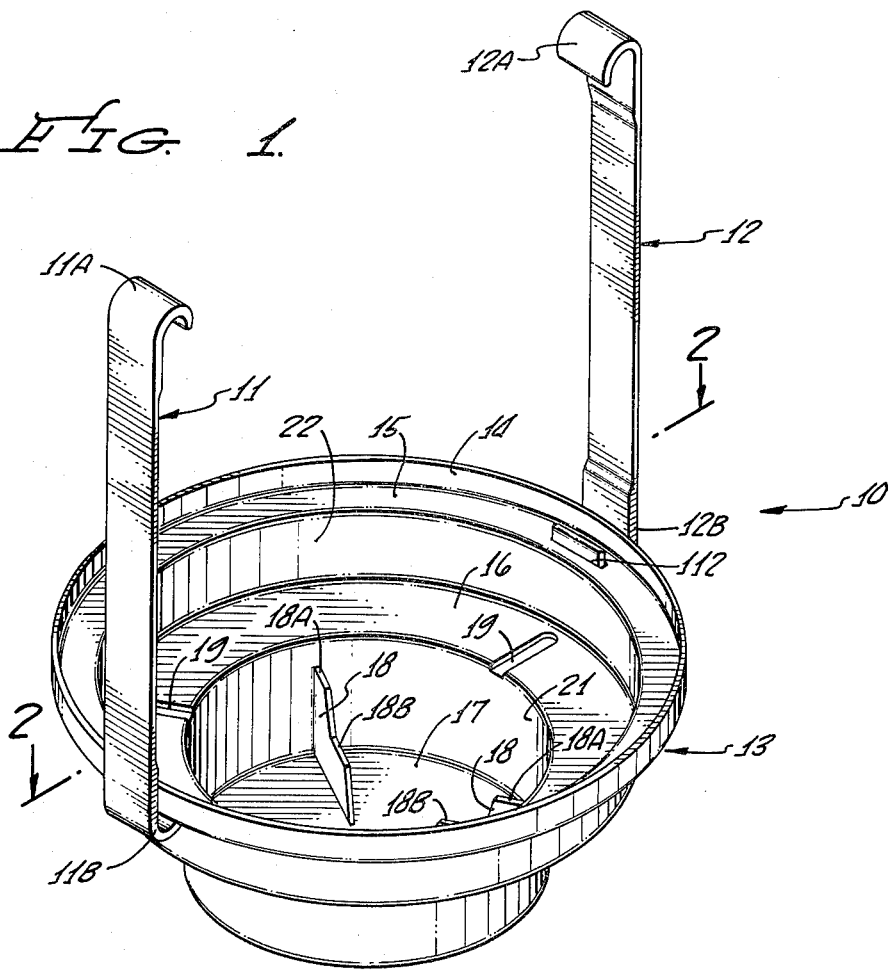
FIG. 1 is a perspective view of the apparatus including the hanging straps.

Referring now to FIG. 1, there is shown a perspective view of the apparatus of the instant invention. The apparatus 10 includes receptacle or pot-like arrangement 13 and a pair of straps 11 and 12 which are on the order of 10 inches long. Straps 11 and 12 include ends 11A and 11B as well as ends 12A and 12B, respectively. The receptacle and straps may be made of any suitable material such as a type of polypropylene, polystyrene, polyethylene, polyurethane or the like. The straps have relatively thin body portions (about 0.060 inch thick) and large end portions (about 0.100 inch thick) to provide additional strength and rigidity. Ends 11A, 12A and 11B and 12B are essentially identical whereby straps 11 and 12 are interchangeable and reversible end for end. In a typical application, the curved ends 11A and 12A of straps 11 and 12, respectively, are hooked over the edges of a flower post or hanging basket or the like. Ends 11B and 12B of straps 11 and 12, respectively, are hooked over the edges of receptacle 10 and inserted through aperture 111 (see FIG. 2) and aperture 112. Apertures 111 and 112 comprise slot-shaped apertures in ledge 15. Ledge 15 is a first step or ledge which is formed below the outer periphery or rim 14 receptacle 10. The width of ledge or shoulder 15 is not critical to the invention but should be sufficient to provide structural strength and area for supporting slots or apertures 111 and 112 therein. In addition, shoulder or ledge 15 can be sufficiently large to support a flower pot or the like when the straps 11 and 12 are removed for a free standing operation.

An additional ledge or shoulder 16 is formed below shoulder 15. Again, the width of ledge 16 is not critical to the invention but provides an additional ledge or shoulder for supporting a flower pot or the like of smaller dimension than is supported on the shoulder 15. It is contemplated that additional ledges may be utilized depending upon the size of receptacle 10. However, an inordinate number of ledges would be impractical, non-utilitarian and expensive to produce.

A suitable trough 10 is produced by forming a recess in ledge 16 in the embodiment shown. Troughs 19 are useful to promote operation of the device as described hereinafter. A plurality of ribs 18 are formed in the angles between the bottom 17 and side wall 21 of receptacle 10. Side wall 21 extends between bottom 17 and ledge 16. In the embodiment shown, ribs 18 are relatively thick upright walls which extend from peripheral wall 21 towards the center of receptacle 10. In a preferred embodiment, rib 18 has a stepped configuration wherein support surfaces 18A and 18B are provided. In the embodiment shown, rib 18 extends only partially across the inner diameter of receptacle 10. It is contemplated that ribs 18 may be formed all the way across receptacle 10. In this arrangement, a pair of such ribs would form an X in the bottom of receptacle 10. However, the function thereof would not be changed from the function of ribs 18 as shown.

Figure 2:
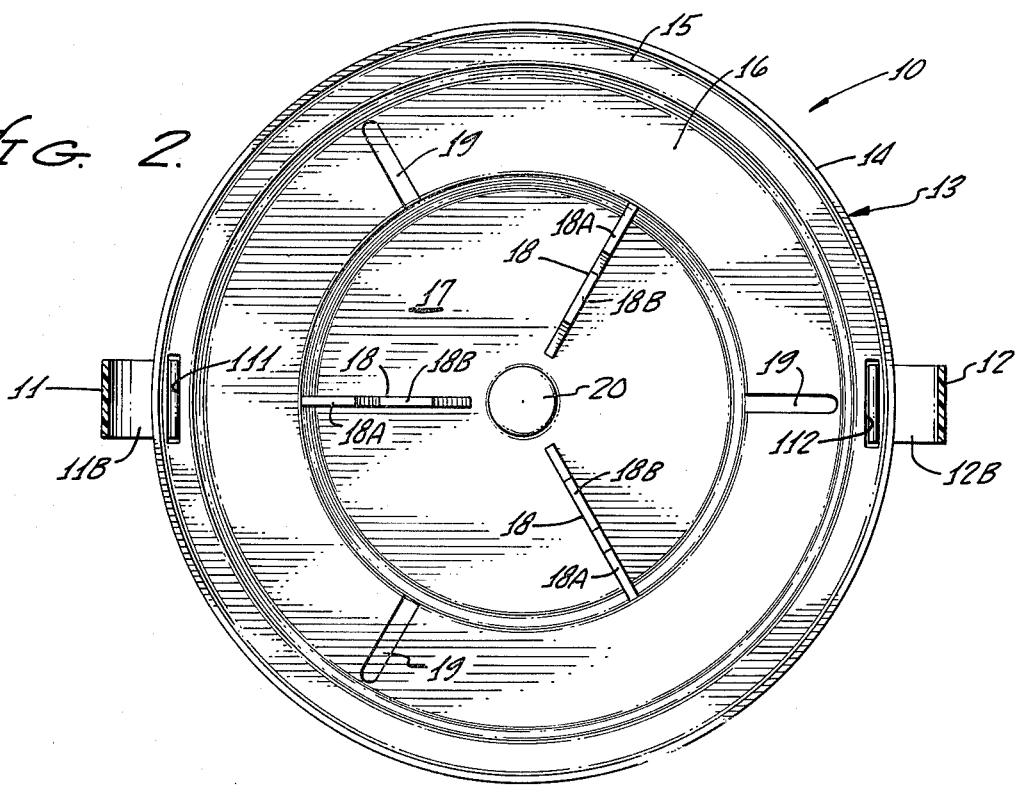
FIG. 2 is a top view of the apparatus shown in FIG. 1 taken along the lines 2—2 of FIG. 1.

Referring now to FIG. 2, there is shown a top view of receptacle 10. In this figure as in other figures, common reference numerals apply to common components. In FIG. 2, straps 11 and 12 are shown hooked into the outer ledge or shoulder 15 of receptacle 10 as suggested in FIG. 1. Ledges 15 and 16 are shown and comprise concentric circular ledges. As noted supra, additional ledges may be provided depending upon the size of receptacle 10. Bottom 17 of receptacle 10 includes central portion 20 which may be raised as shown subsequently. Ribs 18 with shoulders 18A and 18B are indicated as relatively narrow, upright structures. As suggested supra, ribs 18 may be made thicker than suggested. In addition, ribs 18 may traverse the entire diametric dimension of the receptacle. In that case, only two ribs would be required rather than three. However, it is apparent that a three ribbed receptacle may be used in order to effect a reduction in materials required. Troughs 19 are shown in shoulder 16. The troughs extend virtually from upper wall 22 to lower wall 21. The troughs provide a run-off such as described herein.

Figure 3:
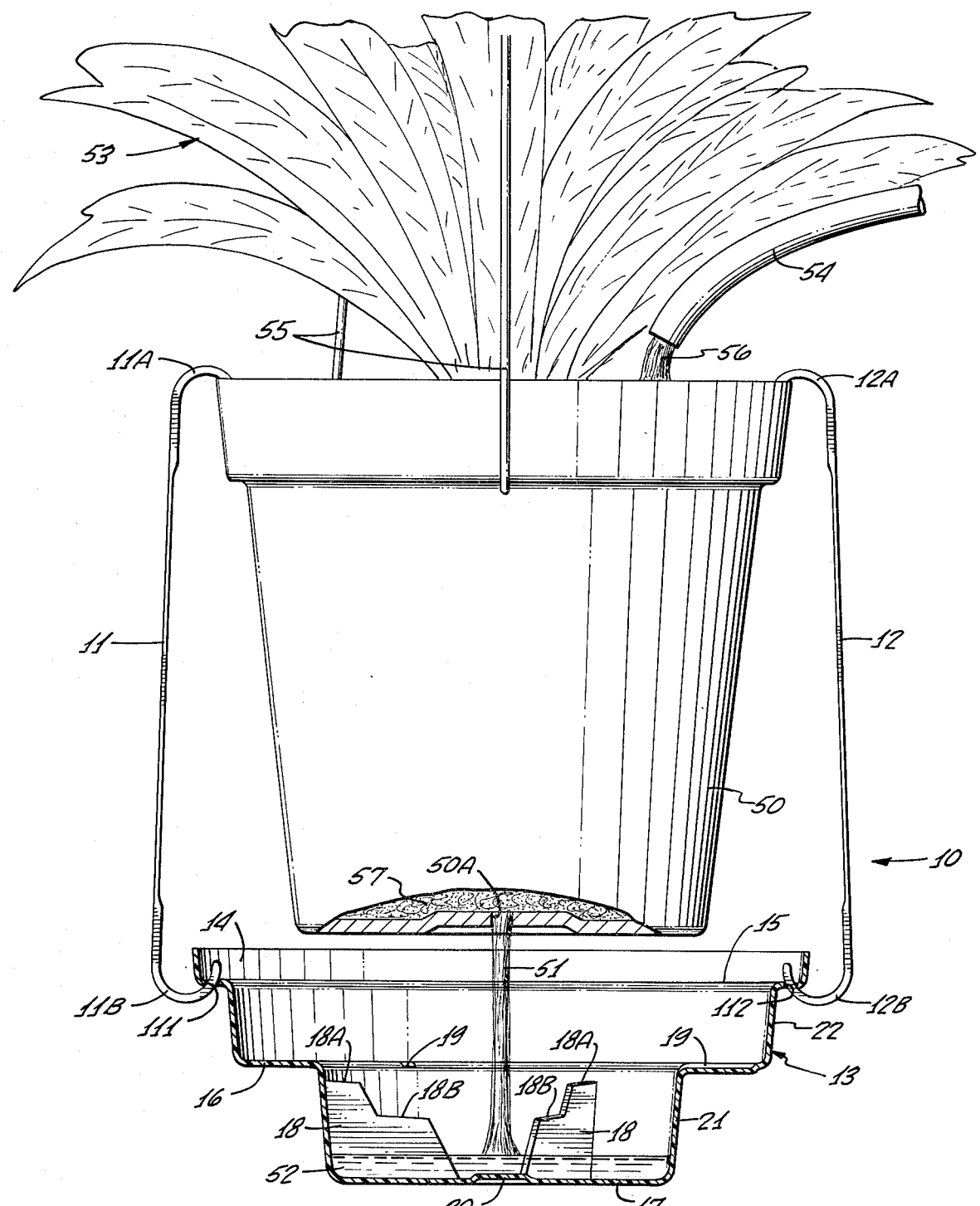
FIG. 3 is a cross-sectional view of the apparatus shown in FIG. 1 including a pot or similar plant receptacle from which the apparatus is suspended.

Referring now to FIG. 3, there is shown one utilization of the instant invention. In this utilization, receptacle 10 is utilized in conjunction with a hanging basket or plant. A hanging planter or pot 50 is suspended from a suitable reference point (not shown) via hanging supports 55 which may be wires, chains, macrames or the like. Pot 50 is used to contain a suitable shrub or flower 53. Shrub 53 is potted in appropriate potting material or soil 57. In this embodiment, a suitable spout 54 which may represent a watering can or the like is used in supplying a suitable liquid 56 which may be water, nutrient or the like. When the appropriate amount of liquid has been applied, soil 57 becomes saturated and liquid begins to flow through aperture 57A at the bottom of the base of pot 50. This through-flow is represented by stream 51 which may include liquid, sediment and the like.

When receptacle 10 is utilized in a hanging basket fashion, straps 11 and 12 are hooked at ends 11A and 12A over the edge of pot 50. Ends 11B and 12B are inserted into apertures 111 and 112 in shoulder 15 to support receptacle 10. In this utilization, as the sludge in stream 51 flows from pot 50, it is collected in receptacle 19 which is suspended below pot 50. In a typical application, receptacle 10 is suffuciently large to receive all of this through-flow. By suspending receptacle 10 beneath the flower pot it is not essential for the person who is watering the plant to maintain careful control so as to avoid saturating the soil 57, to avoid overflow over the rim of pot 50, or to provide a basin or drip pan beneath pot 50.

When the watering operation is completed, receptacle 10 is merely detached from pot 50 either by removing ends 11A and 12A from the pot or ends 11B and 12B from receptacle 10 and discarding the residue in receptacle 10 in any suitable or appropriate manner. Receptacle 10 can then be replaced (or not) as dictated by the further requirements in regard to the appropriate pot.

Figure 4:
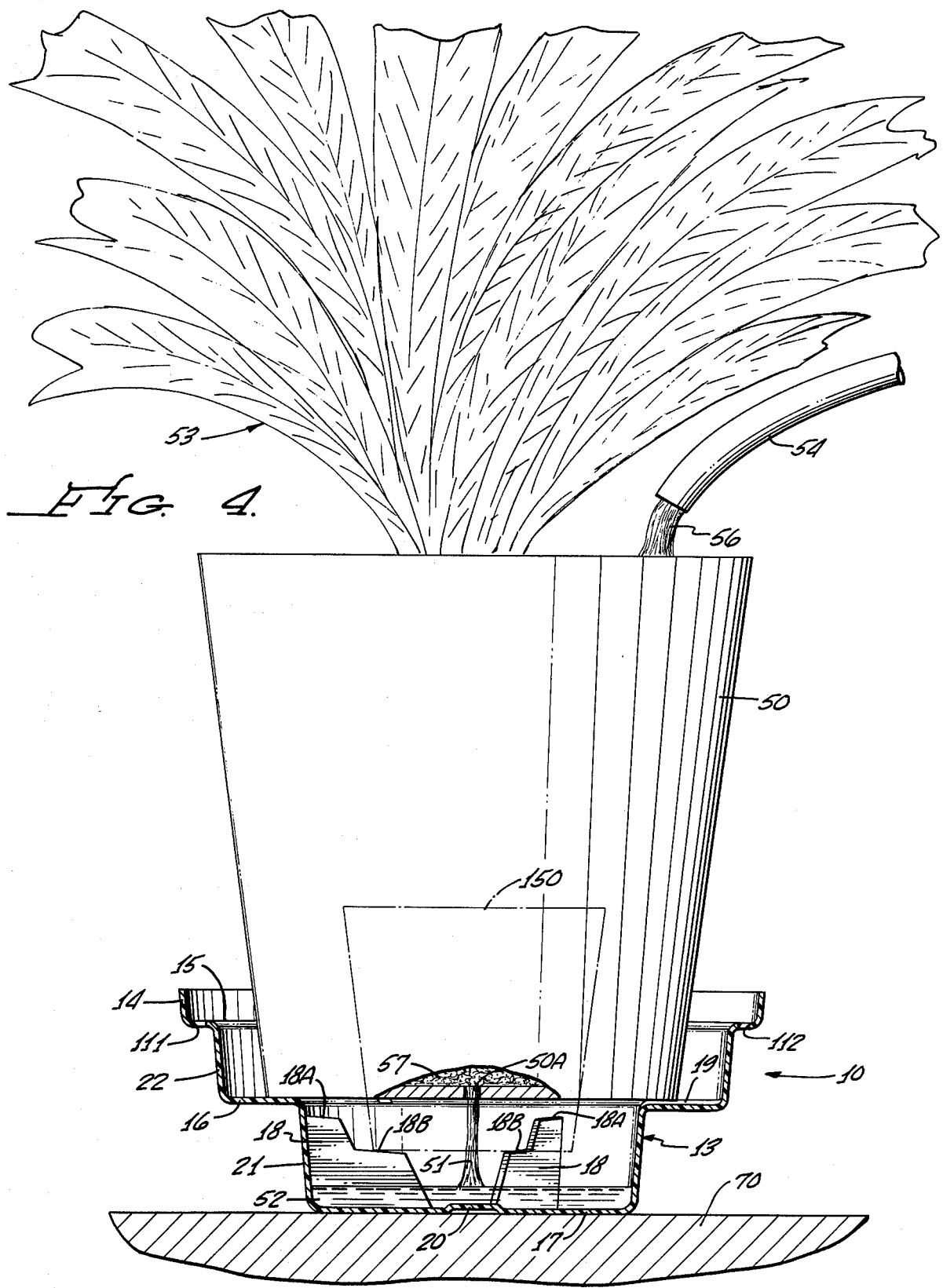
FIG. 4 is a cross-sectional view of the apparatus shown in FIG. 1 with the pots of different diameters shown therein.

Referring now to FIG. 4, there is shown another utilization of receptacle 10. In this utilization, pot 50 which contains plant 53 and soil 57 is seated directly on shoulder 16 of receptacle 10. Receptacle 10 is seated on any suitable surface such as surface 70. Again, as described in FIG. 5, liquid 56 is supplied via spout 54 until the run-off or sludge 51 passes through opening 50A at the bottom of pot 50. This run-off is collected as sludge 52 which may be disposed of in any suitable fashion.

Also shown in FIG. 4 is a smaller diameter pot 150 which is seated on shoulders 18B of ribs 18. The operation of receptacle 10 is identical. That is, run-off 51 will be accumulated as sludge 52 in the bottom of receptacle 10. This sludge may be disposed of in any suitable fashion. Of course, any other pot of any other suitable diameter can be arranged to rest upon on one or more of the ledges or shoulders in the receptacle. Thus, it is seen that the diameter of the pot supported by receptacle 10 can be quite small or quite large depending upon the ledge utilized for support.

It should be noted that in the event that a large diameter pot such as pot 50 is utilized troughs 19 are useful in providing a relief means such that the sludge may flow troughs 19 into the upper part of receptacle 10 thereby relieving pressure on the bottom of pot 50. In addition, troughs 19 permit evaporation of the liquid portion of sludge 52 in the bottom portion of receptacle 10 if the sludge is not immediately removed from the receptacle.

It should be noted that receptacle 10 has the additional utilization in the arrangement shown in FIG. 4 wherein receptacle 10 can be used as a soaker apparatus. That is, pot 50 can be seated in receptacle 10 and water or other liquid applied as shown by means of spout 54. In the case of shrubs such as ferns or the like which require extensive soaking, additional liquid can be applied to receptacle 10 and pot 50 may be permitted to sit in this liquid to absorb the liquid of the receptacle. In this case, troughs 19 permit ready access for the liquid to the bottom portion of receptacle 10 such that it can be absorbed through the bottom of pot 50.

Thus, there has been shown and described a preferred embodiment of improved horticultural apparatus. The embodiment shown includes a receptacle having plurality of shoulders or ledges for supporting pots of different sizes. The number of shoulders or ledges in not limitative of the invention and additional ledges may be inserted or withdrawn. While the material for fabricating the receptacle is not critical to the invention, preferred materials include any suitable plastic materials such as polypropylene, polystyrene, polyethylene, polyurathane or the like. Typically, the receptacle is about 0.100 inch thick. The height and diameter of the receptacle is variable depending upon the size of the pot to be accomodated and, consequently the amount of sludge or sediment which will be received from the pot. However, in one embodiment a height of 4 inches and a diameter of 10 inches has been utilized.

It is understood that those skilled in the art may conceive modifications to the instant invention. Any such modification are intended to be included within the purview of this description. This description is intended to be illustrative only and is not intended to be limitative of the invention. The scope of this invention is defined by the claims appended hereto.

Having thus described a preferred embodiment of the invention, what is claimed is:

1. A receptacle for use with flower pots or the like comprising:

an outer wall having a generally cylindrical configuration;

a bottom member jointed to said outer wall;

a plurality of shoulders of different diameters formed as part of said outer wall, each of said plurality of shoulders defining a support member of different diameter, with the smallest diameter support nearest said bottom member;

a plurality of ribs extending from said bottom member and said outer wall, said ribs being upright walls which extend from said outer wall towards the center of said receptacle, each of said ribs having at least two surfaces for supporting a flower pot;

a pair of removable strap means for engaging the outer wall of said receptacle whereby said receptacle can be suspended from a flower pot or the like, each of said strap means including a relatively thin portion with relatively thickened end portions to impart additional strength thereto, said end portions defining hook attaching means for engaging said apertures;

a pair of apertures in the upper portion of said outer wall to receive end portions of said pair of strap means, said apertures diametrically spaced across said receptacle from each other.

2. The receptacle recited in claim 1 wherein; said trough defines relief means for the movement of materials between upper and lower portions of said receptacle.

3. The receptacle recited in claim 1 wherein;

said end portions further define hook attaching means for hooking over the edge of said flower pots or the like.

* * * * *